United States Patent Office 3,320,145
Patented May 16, 1967

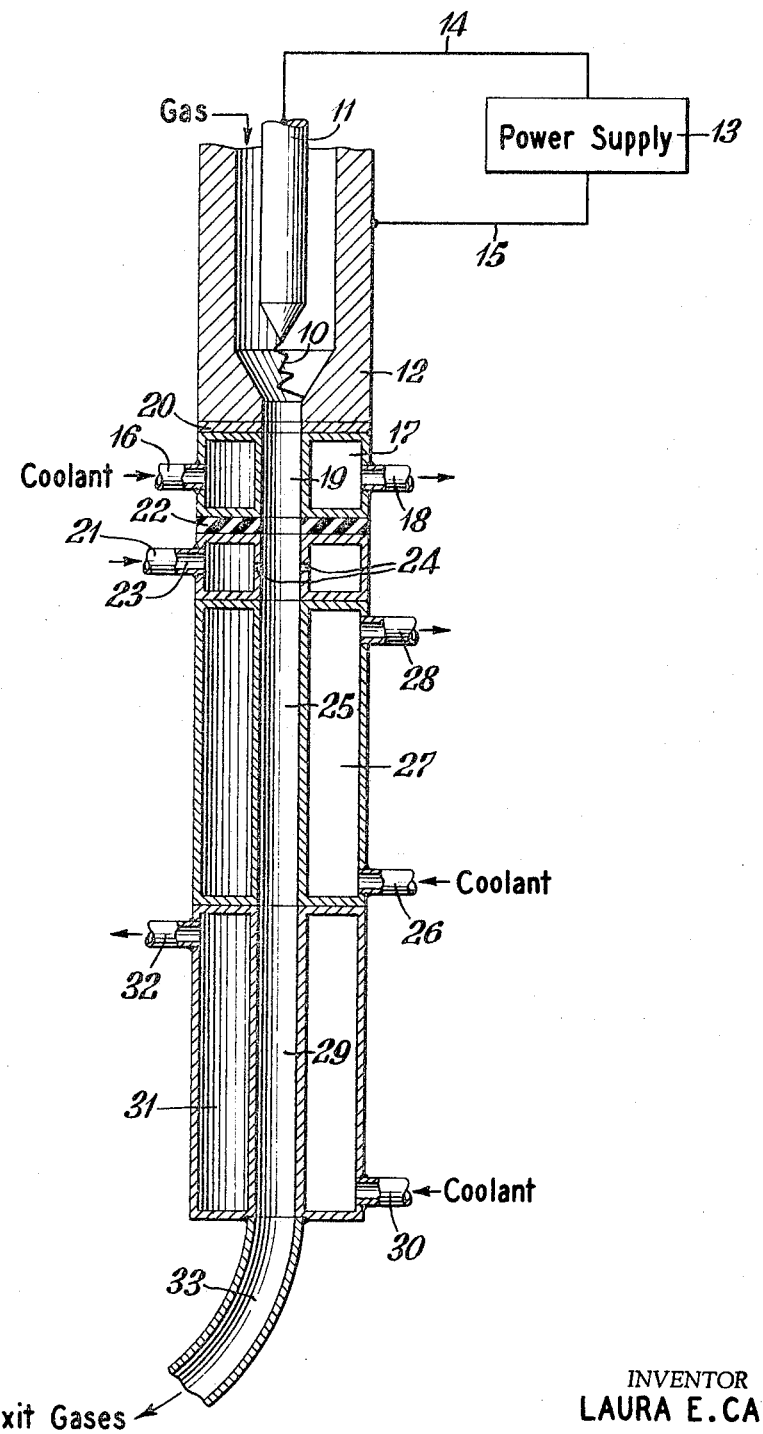

3,320,145
ARC TORCH REDUCTION OF METAL HALIDE
Laura E. Case, Lafayette, Ind., assignor to Union Carbide Corporation, a corporation of New York
Filed Nov. 14, 1961, Ser. No. 152,210
8 Claims. (Cl. 204—164)

The subject invention relates to a process for reduction of metal halides utilizing the high enthalpy of an electric arc-heated stream of hydrogen gas.

Various attempts have been made to reduce metal halide with hot hydrogen. At present no process is known which effectively and efficiently enables an artisan to conduct hydrogen reduction of metal halides on a large scale in a continuous process at high reaction rates to produce a high purity metal product with moderate power expenditures.

It is an object of the present invention to provide a process for reduction of metal halides to metal utilizing high enthalpy hydrogen effluents.

It is another object to provide a process for continuous reduction of metal halides to substantially pure metal powders at high yields and moderate power requirements utilizing substantially ionized, high enthalpy hydrogen effluents.

The afore-mentioned objects are achieved by passing a stream of hydrogen through a collimated electric arc; contacting the effluent stream of highly reactive hydrogen downstream from the collimated electric arc with at least one metal halide; essentially maintaining the mole ratio of hydrogen to metal halide greater than 2 and simultaneously essentially maintaining at least 100 Kcal. of energy per gram mole of selected metal halide in the reaction zone during reaction between the effluent stream of hydrogen and the metal halide; and cooling and recovering powders of the metals.

More specifically, the present process comprises passing a stream of hydrogen through a collimated electric arc; contacting the effluent stream of highly reactive hydrogen downstream from the collimated electric arc with at least one halide of a metal selected from the group consisting of tungsten, molybdenum, tantalum, columbium, beryllium, titanium, boron, aluminum, silicon, and chromium; essentially maintaining the mole ratio of hydrogen to metal halide greater than 2 and simultaneously essentially maintaining at least 100 Kcal. of energy per gram mole of selected metal halide in the reaction zone during reaction between the effluent stream of hydrogen and the selected metal halide; and cooling and recovering powders of the selected metals.

Molecular hydrogen is known to react with metal halides in high heat content systems. As the quantity of heat transferred to the stream of molecular hydrogen increases the molecules become excited and more reactive. Furthermore transfer of heat to the molecules causes ionization of the hydrogen stream thereby producing extremely reactive hydrogen ions in a system having a high total heat content.

A collimated electric arc is desirable and indeed essential as a hydrogen heater for the present invention in that collimation of the arc causes a substantial concentration of the arc energy and passage of hydrogen through such a high intensity heat zone provides more efficient and speedy heat transfer to the hydrogen stream.

The preferred hydrogen heater employs a collimated arc obtained by means of wall-stabilization. In a wall-stabilized arc at least a portion of the arc is surrounded in close proximity by a cooled nozzle wall. As the hydrogen gas passes through the nozzle a substantial portion of the gas will be forced either through the arc or in close relation to it so that the overall hydrogen stream acquires a high heat content. U.S. Patent 2,858,411 provides an enlightening discussion of wall-stabilized collimated electric arcs with apparatus for producing the same. The intense wall-stabilized arc provides a higher heat level for reaction promotion than the arcs previously available to the art.

For the purpose of describing the present process reference is made to the figure of the drawing. The figure is a full section in elevation of an apparatus suitable for use in conducting the present process.

The invention will now be described in more detail with respect to the accompanying figure. An arc 10 is struck between elongated cathode 11 and nozzle anode 12 with electric power supplied by source 13 through leads 14 and 15. The nozzle anode is protected from thermal damage by passing cooling fluid, such as water, which enters inlet 16 passes through annular cooling passage 17 and exits through outlet 18. Hydrogen gas passes around cathode 11 and out through passage 19 in nozzle anode 12.

The combination of relatively cool nozzle passage walls and torch gas stream collimate the portion of the arc in nozzle passage 19 increasing its arc voltage to form a high intensity stabilized arc. The gas which flows through passage 19 thus becomes substantially coextensive with the arc 10 and is heated to a high temperature. The arc gas effluent then exits from passage 19 as a collimated high intensity heat source. The cooling medium which passes through nozzle cooling passage 17 does not cool the hot gas effluent to any appreciable extent.

Diatomic gases, such as hydrogen, have a tendency to increase the arc erosion of the nozzle passage wall 19. It is therefore preferable that the torch be modified to place some refractory metal inserts 20 in the anode nozzle passage walls. Such inserts are partially thermally insulated from the remainder of the water-cooled anode and thus are allowed to run "hot." Such "hot" inserts act as preferential anodes and substantially eliminate nozzle erosion which occurs with diatomic gases. Such preferential electrodes are described in more detail in U.S. 2,951,143.

A metal halide feed inlet means 21 is positioned substantially adjacent to nozzle anode 12 and is separated therefrom by electrical insulator 22. Feed inlet means 21 has an inlet conduit 23 and inlet passage 24 through which desired metal halide feed passes for contact with the arc gas effluent from nozzle passage 19. The proper energy input to the metal halide feed for desired reaction conditions can be conveniently obtained by varying the power input to the torch gas, varying the rate of halide feed injection, or by a combination of these features.

Reaction zone 25 wherein substantially complete mixing takes place between the injected feed stock and the arc gas effluent can be contained within any suitable surrounding means that will not fail at operating temperatures. A water-cooled copper or stainless steel tube may be used, or the reaction chamber may be fabricated from refractory materials if necessary. As shown in the figure, a water-cooled reaction chamber is used with water entering through inlet 26, passing through annular cooling passage 27 and leaving through outlet 28.

The hot reaction gases from reaction zone 25 then pass to quench zone 29 wherein they are cooled to a temperature at which the reduced elemental metal condenses and is separated from the gaseous reaction products as finely divided solid material. As shown in the figure, quench zone 29 is cooled by passing cooling fluid, such as water, from inlet 30 through the annular cooling space 31 then out through outlet 32. The condensed elemental metal is deposited as powder along the walls of the quench zone. Some of the metal powder will be entrained in the gaseous reaction products which leave quench zone 29 through line 33. The entrained powder is separated from the gaseous material by any one of a number of known means such as simple filter techniques.

It will be noted that the reactive hydrogen stream is contacted with metal halide subsequent to passage through and downstream from the electric arc. This is consideration which is critical to the production of metallic powders in the present process. The metal halide starting material must not pass through the arc in contact with reactive hydrogen if powders are desired in the present process. It has been found that simultaneous and direct contact between the highly reactive hydrogen and metal halide in the arc itself results in production of a "metallic mirror" on the walls of the quenching or cooling zone and metallic powders are not recovered. By the same token contact and reaction under controlled conditions between the hydrogen effluent and the metal halide out of contact with the intensely heated electric arc plasma results in the production of metallic powders which are readily separated from the by-product gases.

The metal halides amenable for use in the present process may be categorized by reference to the approximate temperatures or the heat intensity level in the hydrogen reduction systems generally applicable to their treatment.

The first category comprises metal halides, such as those of tungsten, molybdenum, and tantalum, which are reducible at practical reaction rates below about 1500 degrees Kelvin. Accordingly these halides can be reduced in conventional high temperature furnaces. However, columbium, though reducible in this temperature range, exhibits an impractically slow reaction rate. The present process may be utilized on any of the metals of this category and is especially amenable for use in columbium halide reduction enabling metal production at a high rate.

The second category includes the halides, such as those of beryllium and titanium, requiring temperatures above about 3000 degrees Kelvin to obtain reduction at a practical reaction rate. These metal halides require prolonged exposure to the hot hydrogen stream in order to be reduced in the present process. Powders of beryllium and titanium may be produced at reasonable rates by contacting their halides with the reactive hydrogen stream out of contact with the arc plasma. The latter feature of the present invention does result in a product which is much easier to recover.

The third category includes the halides, such as those of boron, aluminum, chromium, and silicon, which are reducible at high reaction rates in the temperature range between about 1500 and 3000 degrees Kelvin. These metal halides are most amenable for reduction by the present process.

In addition to the process restriction relating to the point of introduction of metal halide into the reaction stream (e.g., subsequent to passage of the hydrogen through the arc plasma and its relation to obtaining a preferred powder product), I have found that two other process parameters are critical to achievement of high reaction rates and product yield of metal at low power requirements.

The two process parameters are (1) the mole ratio of hydrogen to metal halide and (2) the total energy available per gm. mole of metal halide during reaction, in the reaction zone.

The mole ratio of hydrogen to metal halide must be maintained at greater than 2 during reaction therebetween and simultaneously the total energy available to the metal halide in the reaction zone must be in excess of 100 Kcal. per gram mole of metal halide during the same reaction.

These parameters must be maintained simultaneously during the reduction of any and all of the above-mentioned metal halides. The hydrogen requirement may be partially fulfilled by injection of hydrogen downstream from the arc separately or in conjunction with the stream of metal halide.

In the modified process wherein a portion of the hydrogen requirement may be provided by injection of hydrogen downstream from the arc, it must be remembered that the energy requirements must be simultaneously maintained during the reaction. The energy requirement may be supplemented by preheating the reactants and/or increasing the power of the arc and/or compensation adjustments of the cooling mechanism in the figure. The modified process is illustrated in Example II below.

In treatment of the boron halides in the present novel process it has been found that maintenance of a mole ratio of hydrogen to boron halide of 2 to 25 simultaneously with maintenance of from 100 to 1700 Kcal. of energy available to the metal halide during the reaction is preferred. Adherence to these parameters enables an artisan to obtain high yields of very pure products.

The most preferred ranges for the subject parameters in treatment of boron trichloride are a mole ratio of hydrogen to $BCl_3$ of 9 to 15 in conjunction with 400 to 1000 Kcal. of energy available from the hydrogen reductant during the reaction.

Boron trichloride is a low-boiling liquid and readily available for industrial applications. Its low boiling point allows it to be readily vaporized and injected into the reactive hydrogen effluent from the collimated arc-heater of the figure. Aluminum and chromium chlorides are solid up to relatively high temperatures and are injected into the apparatus of the figure in a carrier gas stream such as argon.

Example I illustrates a high energy reaction.

Example I

In an apparatus substantially as shown in the figure, an arc of 11.5 kw. was maintained between a 3/16-inch diameter thoriated tungsten elongated cathode and a water-cooled copper nozzle anode having a 3/16-inch diameter anode passage. Two tungsten preferential electrode inserts 1/8-inch in diameter were positioned in the walls of the nozzle anode passage. A hydrogen gas stream was passed around the tungsten electrode and out through the nozzle electrode passage at a flow rate of 61.8 gm. moles/hr. This gas flow forced the arc to terminate within the nozzle passage so that the passage walls acting upon the arc and hydrogen gas flow wall-stabilized and collimated at least a portion of the arc within the nozzle passage resulting in a high energy hydrogen gas effluent. The arc torch outlet communicated with a halide feed inlet and a water-cooled copper reactor having an O.D. of 2¼-inch, an I.D. of 1-inch and a length of 6-inches. This in turn was connected to a water-cooled copper condenser quench zone having an O.D. of 9/16-inch, an I.D. of ½-inch and a length of 18-inches. At the inlet to the reactor the collimated hot hydrogen stream was contacted with a stream of boron trichloride. The flow rate of the stream of boron trichloride was maintained at 4.4 gram-moles/hr. Calculations based on heat content of the hydrogen stream indicated that the energy level in the reaction zone was about 1486 Kcal./gm. mole of $BCl_3$. The mole ratio of $H_2/BCl_3$ was 14.1. The reaction product gases were then quenched in the condenser resulting in finely-divided powder being deposited along the condenser walls and collected at the outlet. The powder was analyzed to contain 89.1 weight percent boron. The conversion of $BCl_3$ raw material to useful product was calculated as 91.6 percent. Prior art hot filament reduction processes typically had conversions in the order of 40 percent. Conversion of $BCl_3$ in the present process was determined by subtracting the boron content of the exit gases from the boron content of the starting material and assuming that the difference was the boron content of the metal product. This eliminates errors resulting from failure to collect all the powder product. The power requirement in this example was about 79 kwh./lb. boron. This compares very favorably with values of about 250–300 kwh./lb. boron required by prior art processes.

Example II illustrates a lower energy level reaction to show further utility of this process. This example also shows that some of the hydrogen can be introduced to the reaction zone separately from the torch gas. The apparatus was substantially the same as that described in Example I and shown in the figure except that the reactor was 1-inch long and had two feed inlets spaced ½-inch apart along the reactor longitudinal axis. A cooling disk was also positioned between the nozzle and the reactor in order to partially cool the torch gas and reduce its energy level. The following Example II was performed.

*Example II*

An arc of 6.1 kw. was maintained between the electrodes while 54.7 gm.-moles/hr. of hydrogen passed through the collimated arc. Boron trichloride at a flow rate of 9.0 gm.-moles/hr. was introduced into contact with the hot hydrogen effluent through the first feed inlet while hydrogen at a flow rate of 102 gm.-moles/hr. was introduced through the second feed inlet downstream from the collimated arc. This resulted in reaction conditions of 109 Kcal./gm.-mole of $BCl_3$ and a mole ratio of $H_2/BCl_3$ of 17.4. The finely-divided yellow-brown crystalline material collected was analyzed to contain 96.6 weight percent boron. The conversion of $BCl_3$ to useful product was calculated as 44.4 percent. The power requirement was about 12.0 kwh./lb. boron.

Example II shows the introduction of a portion of the hydrogen into the reactor downstream from the collimated arc. It is again emphasized, however, that in all cases an arc-heated hydrogen stream must still be used as the primary promoter for the reaction. While the above examples employed relatively cool metal halide feed, it is understood that preheating of the feed can also supply part of the energy available in the reaction zone.

The product purity level of greater than 96 percent obtained in the above example indicates the advantage of the present process. No special precautions for excluding all atmospheric contamination were employed. It is to be understood that a purity level greater than 99 percent can readily be achieved when proper precautions and apparatus design are utilized to protect the product from atmospheric contamination.

In addition to boron production, this novel process can be employed to produce aluminum, columbium, and chromium, for example, from their halides. This is shown by the following examples.

*Example III*

The apparatus was substantially the same as that described in Example I above. An arc of 9.8 kw. was maintained between the torch electrodes while 56.6 gm.-moles/hr. of hydrogen passed through the collimated portion of the arc and through the nozzle outlet. Aluminum trichloride at a flow rate of 0.097 gm.-mole/hr. suspended in an argon carrier gas stream at a flow rate of 48 gm.-moles/hr. was mixed with the hydrogen stream in the reactor. This resulted in reaction conditions whereby a mole ratio of $H_2/AlCl_3$ of 583 and energy level of 45,000 Kcal./gm.-moles of $AlCl_3$ were maintained. The reaction product was a grey powder having an X-ray diffraction pattern of aluminum.

*Example IV*

The apparatus was substantially the same as that described in Example I above. An arc of 9.5 kw. was maintained between the torch electrodes while 56.4 gm.-moles/hr. of hydrogen passed through the collimated portion of the arc and through the nozzle outlet. Columbium pentachloride at a flow rate of 0.714 gm.-mole/hr. suspended in an argon carrier gas stream of 48.5 gm.-moles/hr. was mixed with the hydrogen stream in the reactor. This resulted in reaction conditions wherein a mole ratio of $H_2/CbCl_5$ of 79 and an energy level of 6259 Kcal./gm.-mole $CbCl_2$ were maintained. The reaction product was a pyrophoric black powder having an X-ray pattern of columbium.

*Example V*

The apparatus was substantially the same as that described in Example I above. An arc of 10.3 kw. was maintained between the torch electrodes while 56.8 gm.-moles/hr. of hydrogen passed through the collimated portion of the arc and through the nozzle outlet. Chromium trichloride at a flow rate of 0.391 gm.-mole/hr. suspended in an argon carrier gas stream of 49.5 gm.-moles/hr. was mixed with the hydrogen stream in the reactor. This resulted in reaction conditions wherein a mole ratio of $H_2/CrCl_3$ of 145 and energy level of 12,231 Kcal./gm.-moles $CrCl_3$ were maintained. The reaction product was a dark grey powder having X-ray pattern of chromium.

The values of $H_2$/metal halide mole ratio and energy level of the reactor are unusually high in the Examples III–V above due to the low halide content in the experimental feed streams. Normal commercial practice will increase the metal halide content of the feed stream so as to decrease the above reaction conditions to values approaching those described above for boron halides.

In summary, this novel process described in the above discussion can be employed whenever high quality elemental metal is required and the appropriate metal halide is available. Power requirements are low, conversions and purity are high, and the powder product is readily separated from the gaseous by-products.

In the specification and the following claims, it has been assumed that the heat transfer from the hot hydrogen effluent to any supplementary hydrogen and/or carrier gas injected into the reaction zone downstream from the arc is essentially instantaneous at the operating temperature of the process. Accordingly the energy parameter expressed in Kcal. of energy available to the metal halide in the reaction zone during reaction with the hydrogen is accurately specified as manditorily being maintained during the reaction. Under continuous reaction conditions there is no ambiguity in such a description.

What is claimed is:

1. A process for reduction of metal halides to metal comprising passing a stream of hydrogen through a collimated electric arc; contacting the effluent stream of highly reactive hydrogen downstream from said electric arc with a metal halide; essentially maintaining the mole ratio of hydrogen to metal halide greater than 2 and simultaneously essentially maintaining at least 100 Kcal. of energy per gram mole of said metal halide in the reaction zone during reaction between said effluent stream of hydrogen and said metal halide; and cooling and recovering powders of the metal of said metal halide.

2. A process for reduction of metal halides to metal comprising passing a stream of hydrogen through a collimated electric arc, contacting the effluent stream of highly reactive hydrogen downstream from said electric arc with at least one halide of a metal selected from the group consisting of tungsten, molybdenum, tantalum, columbium, beryllium, titanium, boron, aluminum, silicon, and chromium; essentially maintaining the mole ratio of hydrogen to metal halide greater than 2 and simultaneously essentially maintaining at least 100 Kcal. of energy per gram mole of said selected metal halide in the reaction zone during reaction between said effluent stream of hydrogen and said metal halide; and cooling and recovering powders of said selected metal.

3. A process for reduction of metal halides to metal comprising passing a stream of hydrogen through a collimated electric arc and thereby substantially ionizing said stream of hydrogen, contacting the effluent stream of substantially ionized hydrogen downstream from said electric arc with at least one halide of a metal selected from the group consisting of tungsten, molybdenum, tantalum, columbium, beryllium, titanium, boron, aluminum, silicon, and chromium; essentially maintaining the mole ratio of hydrogen to metal halide greater than 2 and simultaneously essentially maintaining at least 100 Kcal. of energy per gram mole of said selected metal halide in the reaction zone during reaction between said effluent hydrogen stream and said metal halide; and cooling and recovering powders of said selected metal.

4. A process in accordance with claim 1 wherein said stream of hydrogen is passed through a collimated and wall stabilized electric arc prior to contacting said effluent hydrogen stream with said selected metal halide.

5. A process for reduction of boron trihalide comprising passing a stream of hydrogen through and substantially ionizing said stream of hydrogen during passage through a collimated electric arc; contacting the substantially ionized effluent stream of hydrogen downstream from said arc with boron trihalide; essentially maintaining the mole ratio of hydrogen to boron trihalide within the range of 2–25 and simultaneously essentially maintaining a range of 100 to 1700 Kcal. of energy per gram mole of boron trihalide in the reaction zone during reaction between said hydrogen and said boron trihalide; and cooling and recovering powders of boron.

6. A process in accordance with claim 5 wherein said stream of hydrogen is passed through a collimated and wall stabilized electric arc prior to contacting said effluent hydrogen stream with said boron trihalide.

7. A process for reduction of boron trihalide comprising passing a stream of hydrogen through and substantially ionizing said stream of hydrogen during passage through a collimated electric arc; contacting the effluent stream of substantially ionized hydrogen downstream from said arc with boron trihalide; essentially maintaining the mole ratio of hydrogen to boron trihalide within the range of 9 to 15 and simultaneously essentially maintaining a range of 400 to 1000 Kcal. of energy per gram mole of boron trihalide in the reaction zone during reaction between said hydrogen and said boron trihalide; and cooling and recovering powders of boron.

8. A process in accordance with claim 7 wherein said stream of hydrogen is passed through a collimated and wall stabilized electric arc prior to contacting said effluent hydrogen stream with said boron trihalide.

References Cited by the Examiner

UNITED STATES PATENTS

| | | | |
|---|---|---|---|
| 2,236,474 | 3/1941 | Hardy | 75—35 |
| 2,768,061 | 10/1956 | Cook et al. | |
| 2,951,143 | 8/1960 | Anderson et al. | 204—328 |
| 3,051,639 | 8/1962 | Anderson | 204—328 |
| 3,123,464 | 3/1964 | Casey et al. | 75—10 |
| 3,177,067 | 4/1965 | Nichols | 75—84.5 |

OTHER REFERENCES

Tyler, Paul M.: Plasma for Extractive Metallurgy, Journal of Metals, January 1961, pages 51–54.

JOHN H. MACK, *Primary Examiner.*

DAVID L. RECK, WINSTON A. DOUGLAS,
*Examiners.*

N. F. MARKVA, H. S. WILLIAMS, *Assistant Examiners.*